US011685844B2

(12) United States Patent
Kim et al.

(10) Patent No.: US 11,685,844 B2
(45) Date of Patent: Jun. 27, 2023

(54) POLYSILOXANE CONTROLLED RELEASE ADDITIVE, METHOD FOR THE PREPARATION THEREOF, AND RELEASE COATING COMPOSITION

(71) Applicant: Dow Silicones Corporation, Midland, MI (US)

(72) Inventors: Sun Hee Kim, Gangnam-gu (KR); Jeong Gi Kim, Gangnam-gu (KR)

(73) Assignee: DOW SILICONES CORPORATION, Midland, MI (US)

( * ) Notice: Subject to any disclaimer, the term of this patent is extended or adjusted under 35 U.S.C. 154(b) by 107 days.

(21) Appl. No.: 17/437,498

(22) PCT Filed: May 1, 2020

(86) PCT No.: PCT/US2020/030902
§ 371 (c)(1),
(2) Date: Sep. 9, 2021

(87) PCT Pub. No.: WO2020/231644
PCT Pub. Date: Nov. 19, 2020

(65) Prior Publication Data
US 2022/0154044 A1 May 19, 2022

Related U.S. Application Data

(60) Provisional application No. 62/848,822, filed on May 16, 2019.

(51) Int. Cl.
| C09D 183/04 | (2006.01) |
| C09J 7/40 | (2018.01) |
| C08L 83/04 | (2006.01) |

(52) U.S. Cl.
CPC .............. *C09J 7/401* (2018.01); *C08L 83/04* (2013.01); *C09D 183/04* (2013.01); *C08L 2205/02* (2013.01); *C09J 2483/005* (2013.01)

(58) Field of Classification Search
CPC ..... C09J 7/401; C09J 2483/005; C08L 83/04; C08L 2205/02; C09D 183/04; C08G 77/16; C08G 77/12; C08G 77/20
See application file for complete search history.

(56) References Cited

U.S. PATENT DOCUMENTS

| 3,159,601 A | 12/1964 | Ashby |
| 3,220,972 A | 11/1965 | Lamoreaux |
| 3,296,291 A | 1/1967 | Scotia et al. |
| 3,419,593 A | 12/1968 | Willing |
| 3,516,946 A | 6/1970 | Scotia |
| 3,527,659 A | 9/1970 | Keil |
| 3,814,730 A | 6/1974 | Karstedt |
| 3,928,629 A | 12/1975 | Chandra et al. |
| 3,989,668 A | 11/1976 | Lee et al. |
| 4,244,912 A * | 1/1981 | Battice ............... B29C 33/64 264/46.7 |
| 4,374,967 A | 2/1983 | Brown et al. |
| 4,530,989 A | 7/1985 | Michel et al. |
| 4,609,574 A | 9/1986 | Keryk et al. |
| 4,766,176 A | 8/1988 | Lee et al. |
| 4,774,111 A | 9/1988 | Lo |
| 4,784,879 A | 11/1988 | Lee et al. |
| 5,017,654 A | 5/1991 | Togashi et al. |
| 5,036,117 A | 7/1991 | Chung et al. |
| 5,175,325 A | 12/1992 | Brown et al. |
| 5,625,023 A | 4/1997 | Chung et al. |
| 6,200,581 B1 | 3/2001 | Lin et al. |
| 6,586,535 B1 | 7/2003 | Clark et al. |
| 6,605,734 B2 | 8/2003 | Roy et al. |
| 6,806,339 B2 | 10/2004 | Cray et al. |
| 7,238,755 B2 | 7/2007 | Herzig et al. |
| 7,378,482 B2 | 5/2008 | Asch et al. |
| 7,429,636 B2 | 9/2008 | Asch et al. |
| 7,432,338 B2 | 10/2008 | Chapman et al. |
| 7,449,536 B2 | 11/2008 | Chapman et al. |
| 7,906,605 B2 | 3/2011 | Cray et al. |
| 8,722,153 B2 | 5/2014 | Ekeland |
| 8,933,177 B2 | 1/2015 | Hori et al. |
| 9,403,968 B2 | 8/2016 | Ihara et al. |
| 9,562,149 B2 | 2/2017 | Cray et al. |
| 9,732,191 B2 | 8/2017 | Cifuentes et al. |
| 9,758,701 B2 | 9/2017 | Griswold et al. |
| 2003/0088042 A1 | 5/2003 | Griswold et al. |
| 2004/0254274 A1 | 12/2004 | Griswold |
| 2005/0038188 A1 | 2/2005 | Ahn et al. |
| 2011/0287267 A1 | 11/2011 | Hori et al. |

(Continued)

FOREIGN PATENT DOCUMENTS

| EP | 0556023 A1 | 8/1993 |
| EP | 0347895 B1 | 11/1993 |

(Continued)

OTHER PUBLICATIONS

Machine translation of Jp H05-295268, retrieved Apr. 22, 2023.*
Dao et al. "Hydromethylation of Unactivated Olefins," Journal of the American Chemical Society, May 18, 2015, DOI: 10.1021/jacs.5b05144.
Lipp, "Measurement of Trace Silanol in Siloxanes by IR Spectroscopy" Society for Applied Spectroscopy, 1991, vol. 45, No. 3, pp. 477-483.
"Standard Practices for General Techniques of Infrared Quantitative Analysis" Designation: E168-16, ASTM International, 2019, pp. 1-18.

*Primary Examiner* — Michael B Nelson

(74) *Attorney, Agent, or Firm* — Catherine Brown

(57) ABSTRACT

A polysiloxane is prepared by hydrosilylation reaction of a polyorganosilicate resin and an SiH terminated polydiorganosiloxane. The polysiloxane acts as a controlled release additive when formulated into a release coating composition. The release coating composition can be coated on a surface of a substrate and cured to form a release liner.

9 Claims, No Drawings

(56) References Cited

U.S. PATENT DOCUMENTS

2016/0009865 A1   1/2016   Jiang et al.
2016/0053056 A1   2/2016   Gould et al.

FOREIGN PATENT DOCUMENTS

| JP | H05295268 A | | 11/1993 |
|---|---|---|---|
| JP | H05-295268 | * | 12/1993 |
| KR | 198600603 B1 | | 5/1986 |
| WO | 2003050174 A1 | | 6/2003 |
| WO | 2010005113 A1 | | 1/2010 |
| WO | 2015183572 A1 | | 12/2015 |

* cited by examiner

POLYSILOXANE CONTROLLED RELEASE ADDITIVE, METHOD FOR THE PREPARATION THEREOF, AND RELEASE COATING COMPOSITION

CROSS REFERENCE TO RELATED APPLICATIONS

This application is a U.S. national stage filing under 35 U.S.C. § 371 of PCT Application No. PCT/US20/030902 filed on 1 May 2020, currently pending, which claims the benefit of U.S. Provisional Patent Application No. 62/848,822 filed on 16 May 2019 under 35 U.S.C. § 119 (e). PCT Application No. PCT/US20/030902 and U.S. Provisional Patent Application No. 62/848,822 are hereby incorporated by reference.

TECHNICAL FIELD

A polysiloxane is useful as a controlled release additive for release coating compositions. The release coating composition containing the polysiloxane may be coated on a substrate and cured to form a release liner with improved properties.

BACKGROUND

Silicone release coating compositions can be used to form release liners from which adhesives can be removed. For example, silicone release coating compositions may be utilized to coat various substrates, such as paper or plastic film, to give release liners for laminating pressure sensitive adhesives (e.g., labels or tapes). Many silicone release coating compositions are hydrosilylation reaction curable. Conventional release liners may be formed by hydrosilylation reaction of a release coating composition containing a polyorganosiloxane having an aliphatically unsaturated hydrocarbon group and a polyorganohydrogensiloxane in the presence of a hydrosilylation reaction catalyst. However, the release force of conventional release liners is often undesirably low. For example, in hand peel applications, a low release force often leads to undesirable dispensing of a label.

SUMMARY

A polysiloxane and method for its preparation are disclosed. The polysiloxane is useful as a controlled release additive. A release coating composition containing the polysiloxane is useful for forming a release liner. The release liner comprises a release coating prepared by curing the release coating composition on a surface of a substrate.

DETAILED DESCRIPTION

Polysiloxane

The polysiloxane comprises M, Q, $M^U$, and $D^L$ siloxane units. In the polysiloxane:
M represents a unit of formula:

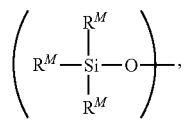

Q represents a unit of formula

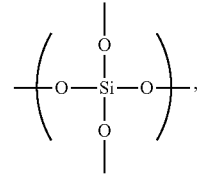

$M^U$ represents a unit of formula

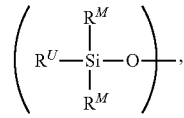

and
$D^L$ represents a unit of formula

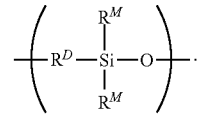

The polysiloxane may optionally further comprise a D unit and/or a silanol functional unit.
D represents a unit of formula

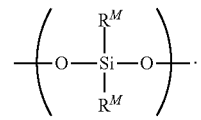

The silanol functional unit may be a $M^{OH}$ and/or a $T^{OH}$ unit.
$M^{OH}$ represents a unit of formula

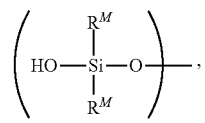

and
$T^{OH}$ represents a unit of formula

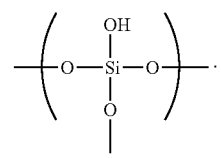

Alternatively, the polysiloxane may consist essentially of M, Q, $M^U$, $D^L$, and D units, optionally including $M^{OH}$ and/or $T^{OH}$ siloxane units. Alternatively, the polysiloxane consists of M, Q, $M^U$, $D^L$, and D units, optionally including $M^{OH}$ and/or $T^{OH}$ siloxane units. The polysiloxane may have sufficient $M^{OH}$ and $T^{OH}$ units to provide the polysiloxane with a silanol content of 1.7% or less, alternatively 0.3% to 1.7%.

In the units above, each $R^M$ is an independently selected monovalent hydrocarbon group of 1 to 30 carbon atoms that is free of aliphatic unsaturation. Alternatively, each $R^M$ may have 1 to 12 carbon atoms, and alternatively 1 to 6 carbon atoms. Suitable monovalent hydrocarbon groups for $R^M$ are exemplified by alkyl groups such as methyl, ethyl, propyl (e.g., iso-propyl and/or n-propyl), butyl (e.g., isobutyl, n-butyl, tert-butyl, and/or sec-butyl), pentyl (e.g., isopentyl, neopentyl, and/or tert-pentyl), hexyl, heptyl, octyl, nonyl, and decyl, and branched alkyl groups of 6 or more carbon atoms, cyclopentyl and cyclohexyl; aryl groups such as phenyl, tolyl, xylyl, and naphthyl; aralkyl groups such as benzyl and phenethyl. Alternatively, each $R^M$ may be alkyl or aryl. Alternatively, each $R^M$ may be alkyl. Alternatively, each $R^M$ may be methyl.

Each $R^U$ is an independently selected monovalent aliphatically unsaturated hydrocarbon group of 2 to 30 carbon atoms. Alternatively, each $R^U$ may have 2 to 12 carbon atoms, and alternatively 2 to 6 carbon atoms. Suitable monovalent aliphatically unsaturated hydrocarbon groups include alkenyl groups and alkynyl groups. "Alkenyl" means a branched or unbranched, monovalent hydrocarbon group having one or more carbon-carbon double bonds. Suitable alkenyl groups are exemplified by vinyl; allyl; propenyl (e.g., isopropenyl, and/or n-propenyl); and butenyl, pentenyl, hexenyl, and heptenyl, (including branched and linear isomers of 4 to 7 carbon atoms); and cyclohexenyl. "Alkynyl" means a branched or unbranched, monovalent hydrocarbon group having one or more carbon-carbon triple bonds. Suitable alkynyl groups are exemplified by ethynyl, propynyl, and butynyl (including branched and linear isomers of 2 to 4 carbon atoms). Alternatively, each $R^U$ may be alkenyl, such as vinyl, allyl, or hexenyl.

Each $R^D$ is an independently selected divalent hydrocarbon group of 2 to 30 carbon atoms. Alternatively, each $R^D$ may have 2 to 18 carbon atoms, alternatively 2 to 12 carbon atoms, and alternatively 2 to 6 carbon atoms. Suitable divalent hydrocarbon groups for $R^D$ are exemplified by alkylene groups such as —(CH$_3$)CH—, —CH$_2$—CH$_2$— (ethylene), propylene (including isopropylene and n-propylene), and butylene (including n-butylene, t-butylene and isobutylene); and pentylene, hexylene, heptylene, and octylene, including branched and linear isomers of 5-8 carbon atoms; arylene groups such as phenylene, e.g., ortho-phenylene; and alkaralkylene groups such as:

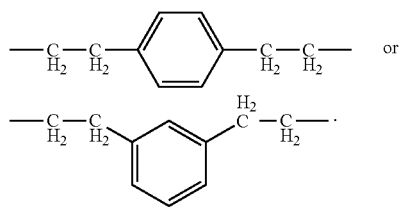

Alternatively, each divalent hydrocarbon group may be ethylene, propylene, butylene or hexylene. Alternatively, each divalent hydrocarbon group may be ethylene or propylene.

The polysiloxane comprises unit formula $M_aQ_bM^U_cD^L_dD_eM^{OH}_qT^{OH}_r$, where M, Q, $M^U$, $D^L$, D, $M^{OH}$, and $T^{OH}$ are as described above, subscript a≥30, subscript b≥40, subscript c≥1, subscript d≥1, a quantity (c+d)≥1, subscript e is 0 to 20, subscript q≥0, and subscript r≥0, with the proviso that a quantity (q+r) is sufficient to provide the polysiloxane with a silanol content of 0 to 1.7%, alternatively 0.3% to 1.7%. Alternatively, subscript a may be 30 to 90, alternatively 35 to 90, and alternatively 40 to 90. Alternatively, subscript b may be 40 to 120, and alternatively 50 to 120. Alternatively, the quantity (c+d) may be 1 to 8, alternatively 3 to 16. Alternatively, subscript e may be 2 to 20, alternatively 2 to 18. Alternatively, the polysiloxane consists essentially of unit formula $M_aQ_bM^U_cD^L_dD_eM^{OH}_qT^{OH}_r$, and alternatively, the polysiloxane consists of unit formula $M_aQ_bM^U_cD^L_dD_eM^{OH}_qT^{OH}_r$.

Method of Making the Polysiloxane

The polysiloxane described above may be prepared by a method comprising:
1) combining starting materials comprising
i) a polyorganosilicate resin comprising unit formula $(R^M_3SiO_{1/2})_f(SiO_{4/2})_g(R^UR^M_2SiO_{1/2})_h$, where f≥30, subscript g≥40, and subscript h≥1;
ii) an SiH terminated polydiorganosiloxane of formula

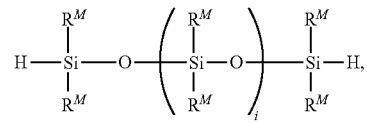

where subscript i has a value such that 0≤i≤20;
where starting materials ii) and i) are present in amounts sufficient to provide a molar ratio of SiH groups to silicon bonded aliphatically unsaturated hydrocarbon groups (SiH:Vi ratio) of 0.2:1 to 0.7:1;
iii) a hydrosilylation reaction catalyst; and
optionally iv) a solvent. The starting materials may be combined by any convenient means, such as mixing. One or more of the starting materials such as i) the polyorganosilicate resin, iii) the hydrosilylation reaction catalyst, or both, may be dissolved in iv) the solvent to facilitate mixing. Starting materials i), iii) and iv) may be combined and heated, e.g., at 25° C. to 150° C., and thereafter starting material ii) may be added, e.g., by metering to control exothermic reaction.

Starting Material i) Polyorganosilicate Resin

The polyorganosilicate resin used as starting material i) in the method for making the polysiloxane described above comprises unit formula: $M_fQ_gM^U_h$, where M, Q, and $M^U$ units are as described above, subscript f≥30, subscript g≥40, and subscript h≥1. Alternatively, subscript f may be 30 to 45, alternatively 35 to 45, alternatively 35 to 40, and alternatively 40 to 45. Alternatively, subscript g may be 40 to 60, alternatively 50 to 60, and alternatively 55 to 60. Alternatively, subscript h may be 1 to 11, alternatively 1 to 8, alternatively 3 to 8, and alternatively 4 to 6. The polyorganosilicate resin may further comprise $M^{OH}$ and/or $T^{OH}$ units in amounts sufficient to provide 2% or less, alternatively 1.7% or less, and alternatively 1.3% or less, and alternatively 0.3% to 1.7% silanol groups, where $M^{OH}$ and $T^{OH}$ units are as described above. The concentration of silanol groups present in the polyorganosiloxane may be determined using FTIR spectroscopy according to ASTM Standard E-168-16. Polyorganosilicate resins suitable for use as starting material i), and methods for the preparation thereof, are known in the art, for example, in U.S. Pat. No. 9,732,191. Suitable polyorganosilicate resins for starting material i) are commercially available, such as DOWSIL™ 6-3444 INT from Dow Silicones Corporation of Midland, Mich., USA.

Starting Material ii) SiH Terminated Polydiorganosiloxane

Starting material ii) has formula

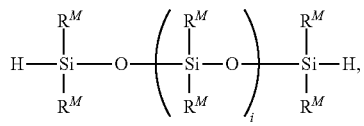

where $R^M$ is as described above, and subscript i is 0 to 20, alternatively 0 to 18, and alternatively 2 to 18. Examples of suitable SiH terminated polydiorganosiloxanes include SiH terminated polydimethylsiloxane, SiH terminated poly(dimethyl/methylphenyl)siloxane, SiH terminated polymethylphenylsiloxane, and combinations thereof. SiH terminated polydiorganosiloxanes are commercially available, e.g., hydride terminated polydimethylsiloxanes such as DMS-H03 and DMS-H05 are commercially available from Gelest Inc., of Morrisville, Pa., USA. SiH terminated polymethylphenylsiloxanes such as PMS-H03 are also commercially available from Gelest. 1,1,3,3-tetramethyldisiloxane is commercially available as DOWSIL™ 3-7010 INTERMEDIATE from Dow Silicones Corporation. DOWSIL™ Q2-5057S is a SiH terminated polydimethylsiloxane, also commercially available from Dow Silicones Corporation. Starting materials i) and ii) may be present in amounts sufficient to provide SiH:Vi Ratio of 0.2:1 to 0.7:1, alternatively 0.2:1 to 0.5:1.

Starting Material iii) Hydrosilylation Reaction Catalyst

Hydrosilylation reaction catalysts are known in the art and are commercially available. Hydrosilylation reaction catalysts include platinum group metal catalysts. Such hydrosilylation reaction catalysts can be a metal selected from platinum, rhodium, ruthenium, palladium, osmium, and iridium. Alternatively, the hydrosilylation reaction catalyst may be a compound of such a metal, for example, chloridotris(triphenylphosphane)rhodium(I) (Wilkinson's Catalyst), a rhodium diphosphine chelate such as [1,2-bis(diphenylphosphino)ethane]dichlorodirhodium or [1,2-bis(diethylphospino)ethane]dichlorodirhodium, chloroplatinic acid (Speier's Catalyst), chloroplatinic acid hexahydrate, platinum dichloride, and complexes of said compounds with low molecular weight organopolysiloxanes or platinum compounds microencapsulated in a matrix or coreshell type structure. Complexes of platinum with low molecular weight organopolysiloxanes include 1,3-diethenyl-1,1,3,3-tetramethyldisiloxane complexes with platinum (Karstedt's Catalyst). These complexes may be microencapsulated in a resin matrix. Alternatively, a hydrosilylation reaction catalyst may comprise 1,3-diethenyl-1,1,3,3-tetramethyldisiloxane complex with platinum. Exemplary hydrosilylation reaction catalysts are described in U.S. Pat. Nos. 3,159,601; 3,220,972; 3,296,291; 3,419,593; 3,516,946; 3,814,730; 3,989,668; 4,784,879; 5,036,117; and 5,175,325; and EP 0 347 895 B. Microencapsulated hydrosilylation reaction catalysts and methods of preparing them are known in the art, as exemplified in U.S. Pat. Nos. 4,766,176 and 5,017,654. Hydrosilylation reaction catalysts are commercially available, for example, SYL-OFF™ 4000 Catalyst and SYL-OFF™ 2700 are available from Dow Silicones Corporation.

The amount of hydrosilylation reaction catalyst used herein will depend on various factors including the selection of starting materials i) and ii) and their respective contents of silicon bonded hydrogen atoms and aliphatically unsaturated groups and the content of the platinum group metal in the catalyst selected as starting material iii), however, the amount of hydrosilylation reaction catalyst is sufficient to catalyze hydrosilylation reaction of SiH and aliphatically unsaturated groups, alternatively the amount of catalyst is sufficient to provide 1 ppm to 1000 ppm of the platinum group metal based on combined weights of starting materials i), ii), and iii); alternatively 1 ppm to 100 ppm, on the same basis.

Starting Material iv) Solvent

Starting material iv) is a solvent. Suitable solvents include organic liquids exemplified by, but not limited to, aromatic hydrocarbons, aliphatic hydrocarbons, alcohols, aldehydes, ketones, amines, esters, ethers, glycols, glycol ethers, alkyl halides and aromatic halides. Hydrocarbons include benzene, toluene, xylene, hexane, heptane, octane, isododecane, isohexadecane, Isopar L (C11-C13), Isopar H(C11-C12), hydrogenated polydecene. Suitable alcohols include, but are not limited to, methanol, ethanol, isopropanol, butanol, or n-propanol. Suitable ketones include, but are not limited to, acetone, methylethyl ketone, or methyl isobutyl ketone. Ethers and esters include, isodecyl neopentanoate, neopentylglycol heptanoate, glycol distearate, dicaprylyl carbonate, diethylhexyl carbonate, propylene glycol n-propyl ether, propylene glycol-n-butyl ether, ethyl-3 ethoxypropionate, propylene glycol methyl ether acetate, tridecyl neopentanoate, propylene glycol methylether acetate (PGMEA), propylene glycol methylether (PGME), dipropylene glycol methyl ether, or ethylene glycol n-butyl ether, octyldodecyl neopentanoate, diisobutyl adipate, diisopropyl adipate, propylene glycol dicaprylate/dicaprate, octyl ether, and octyl palmitate. Alternatively, the solvent may be selected from polyalkylsiloxanes, alcohols, ketones, glycol ethers, tetrahydrofuran, mineral spirits, naphtha, tetrahydrofuran, mineral spirits, naphtha, or a combination thereof. Polyalkylsiloxanes with suitable vapor pressures may be used as the solvent, and these include hexamethyldisiloxane, octamethyltrisiloxane, hexamethylcyclotrisiloxane, octamethylcyclotetrasiloxane, decamethylcyclopentasiloxane, dodecamethylcyclohexasiloxane, octamethyltrisiloxane, decamethyltetrasiloxane, dodecamethylpentasiloxane, tetradecamethylhexasiloxane, hexadecamethylheptasiloxane, heptamethyl-3-{(trimethylsilyl)oxy)}trisiloxane, hexamethyl-3,3, bis{(trimethylsilyl)oxy}trisiloxane pentamethyl{(trimethylsilyl)oxy}cyclotrisiloxane, and combinations thereof. Low molecular weight polyalkylsiloxanes, such as 0.5 to 1.5 cSt polydimethylsiloxanes are known in the art and commercially available as DOWSIL™ 200 Fluids and DOWSIL™ OS FLUIDS, which are commercially available from Dow Silicones Corporation.

The amount of solvent will depend on various factors including the type of solvent selected and the amount and type of other starting materials selected. However, the amount of solvent may be 0% to 99%, alternatively 0 to 98%, alternatively 0 to 70%, and alternatively 2% to 50%, based on the weight of all starting materials used in the method to prepare the polysiloxane. The solvent may be added during preparation of the polysiloxane, for example, to aid mixing and delivery. Certain starting materials may be delivered in solvent, such as i) the polyorganosilicate resin and/or iii) the hydrosilylation reaction catalyst.

Release Coating Composition

The polysiloxane described above is useful in a release coating composition. The release coating composition comprises:

(A) the polysiloxane described above;
(B) a polyorganohydrogensiloxane having at least two silicon-bonded hydrogen atoms per molecule;
(C) a hydrosilylation reaction catalyst; and
(D) a polyorganosiloxane having at least two silicon bonded aliphatically unsaturated groups per molecule.

The release coating may optionally further comprise one or more additional starting materials.

The additional starting material may be selected from the group consisting of (E) a solvent, (F) a hydrosilylation reaction inhibitor, (G) an anchorage additive, (H) an antimist additive, and (I) two or more of (E), (F), (G), and (H).

Starting Material (B)

Starting material (B) in the release coating composition is a polyorganohydrogensiloxane having an average, per molecule, of at least 2 silicon bonded hydrogen atoms. Alternatively, the polyorganohydrogensiloxane may have at least 3 silicon bonded hydrogen atoms per molecule. The silicon-bonded hydrogen atoms may be terminal, pendant, or in both terminal and pendant locations in the polyorganohydrogensiloxane. The polyorganohydrogensiloxane may comprise any of the following siloxy units including silicon-bonded hydrogen atoms, optionally in combination with siloxy units which do not include any silicon-bonded hydrogen atoms: $(R^5_2HSiO_{1/2})$, $(R^5H_2SiO_{1/2})$, $(H_3SiO_{1/2})$, $(R^5HSiO_{2/2})$, $(H_2SiO_{2/2})$, and/or $(HSiO_{3/2})$, where each $R^5$ is independently a monovalent hydrocarbon group or a monovalent halogenated hydrocarbon group.

Each $R^5$ is an independently selected monovalent hydrocarbon group or monovalent halogenated hydrocarbon group, as introduced above, and may be linear, branched, cyclic, or combinations thereof. Cyclic hydrocarbon groups encompass aryl groups as well as saturated or non-conjugated cyclic groups. Aryl groups may be monocyclic or polycyclic. Linear and branched hydrocarbon groups may independently be saturated or unsaturated. Suitable monovalent hydrocarbon groups may be exemplified by alkyl, alkenyl groups, alkynyl groups, aryl groups, and aralkyl groups, as described above for $R^M$ and $R^U$. Suitable monovalent halogenated hydrocarbon groups are exemplified by halogenated alkyl groups such as 3-chloropropyl, 2-bromoethyl, fluoromethyl, 2-fluoropropyl, and 3,3,3-trifluoropropyl, 4,4,4-trifluorobutyl, 4,4,4,3,3-pentafluorobutyl, 5,5,5,4, 4,3,3-heptafluoropentyl, 6,6,6,5,5,4,4,3,3-nonafluorohexyl, and 8,8,8,7,7-pentafluorooctyl, 2,2-difluorocyclopropyl, 2,3-difluorocyclobutyl, 3,4-difluorocyclohexyl, and 3,4-difluoro-5-methylcycloheptyl, chloromethyl, 2-dichlorocyclopropyl, and 2,3-dichlorocyclopentyl. Halogenated aryl groups for $R^5$ are exemplified by, but not limited to, chlorobenzyl and fluorobenzyl. Alternatively, each $R^5$ may be an independently selected monovalent hydrocarbon group.

Alternatively, the polyorganohydrogensiloxane may have the average formula: $(R^6_3SiO_{1/2})_{hh}(R^5_2SiO_{2/2})_{ii}(R^5HSiO_{2/2})_{jj}$, where each $R^6$ is independently hydrogen or $R^5$, each $R^5$ is as described above, and subscript hh≥2, subscript ii≥0, and subscript jj≥2. Alternatively, subscript hh is 2 to 10, alternatively 2 to 8, and alternatively 2 to 6. Alternatively, subscript ii is 0 to 1,000, alternatively 1 to 500, and alternatively 1 to 200. Alternatively, subscript jj is 2 to 500, alternatively 2 to 200, and alternatively 2 to 100. Alternatively, each $R^6$ is $R^5$.

Alternatively, the polyorganohydrogensiloxane may have an average formula selected from: $(R^6_3SiO_{1/2})_{hh}(R^5_2SiO_{2/2})_{ii}(R^5HSiO_{2/2})_{jj}(R^5SiO_{3/2})_{kk}$,  $(R^6_3SiO_{1/2})_{hh}(R^5_2SiO_{2/2})_{ii}(R^5HSiO_{2/2})_{jj}(SiO_{4/2})_{mm}$, 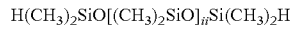 $(R^6_3SiO_{1/2})_{hh}(R^5_2SiO_{2/2})_{ii}(R^5HSiO_{2/2})_{jj}(SiO_{4/2})_{mm}(R^5SiO_{3/2})_{kk}$, and combinations of two or more thereof; where each $R^6$, $R^5$, and subscripts hh, ii, and jj are as defined above, subscript kk≥0, and subscript mm is ≥0. Alternatively, 1≥kk≥0, and 1≥mm≥0.

Alternatively, the polyorganohydrogensiloxane may be linear and may include pendant silicon bonded hydrogen atoms. This polyorganohydrogensiloxane may be a dimethyl, methyl-hydrogen polysiloxane having the average formula:

$(CH_3)_3SiO[(CH_3)_2SiO]_{ii}[(CH_3)HSiO]_{jj}Si(CH_3)_3$ where subscripts ii and jj are defined above.

Alternatively, the polyorganohydrogensiloxane may be linear and may include terminal silicon bonded hydrogen atoms. This polyorganohydrogensiloxane may be an SiH terminal dimethyl polysiloxane having the average formula:

$H(CH_3)_2SiO[(CH_3)_2SiO]_{ii}Si(CH_3)_2H$ where subscript ii is as defined above. The SiH terminal dimethyl polysiloxane may be used alone or in combination with the dimethyl, methyl-hydrogen polysiloxane disclosed immediately above. When a mixture is used, the relative amount of each organohydrogensiloxane in the mixture may vary.

Alternatively, the polyorganohydrogensiloxane may include both pendant and terminal silicon-bonded hydrogen atoms. Alternatively, the polyorganohydrogensiloxane may comprise an alkylhydrogen cyclosiloxane or an alkylhydrogen dialkyl cyclosiloxane copolymer, represented in general by the formula $(R^6_2SiO)_{nn}(R^5HSiO)_{oo}$, where $R^6$ and $R^5$ are as defined above, and where subscript nn is an integer from 0 to 7 and subscript oo is an integer from 3 to 10. Specific examples of suitable organohydrogensiloxanes of this type include $(OSiMeH)_4$, $(OSiMeH)_3(OSiMeC_6H_{13})$, $(OSiMeH)_2(OSiMeC_6H_{13})_2$, and $(OSiMeH)(OSiMeC_6H_{13})_3$, where Me represents methyl (—CH$_3$).

Other examples of suitable polyorganohydrogensiloxanes are those having at least two SiH containing cyclosiloxane rings in one molecule. Such an organohydrogensiloxane may be any organopolysiloxane having at least two cyclosiloxane rings with at least one silicon-bonded hydrogen (SiH) atom on each siloxane ring. Cyclosiloxane rings contain at least three siloxy units (that is the minimum needed to form a siloxane ring), and may be any combination of monofunctional, difunctional, trifunctional, and quadrifunctional siloxy units that forms a cyclic structure, provided that at least one of the cyclic siloxy units on each siloxane ring contains one SiH unit, which may be a monofunctional siloxy unit, a difunctional siloxy unit, and/or a trifunctional siloxy unit. These siloxy units can be represented, for example, as $(MeHSiO_{1/2})$, $(MeHSiO_{2/2})$, and $(HSiO_{3/2})$ siloxy units, respectively, when the substituents other than hydrogen are methyl.

Alternatively, starting material (B) may be a crosslinker having an average of at least 3 silicon bonded hydrogen atoms per molecule, and the curable composition may be a release coating composition. The crosslinker may be present in the release coating composition in an amount sufficient to provide a molar ratio of silicon bonded hydrogen atoms to aliphatically unsaturated groups (SiH:Vi ratio) of >1:1 to 5:1, alternatively 1.2:1 to 2:1. The crosslinker may by a polyorganohydrogensiloxane crosslinker of unit formula (B-1): $(R^5_3SiO_{1/2})_2(R^5_2SiO_{2/2})_{pp}(R^5HSiO_{2/2})_{qq}$, where $R^5$ is as described above and subscript pp≥0, subscript qq>0, and a quantity (pp+qq) is 8 to 400. Subscripts pp and qq may have values selected such that the polyorganohydrogensiloxane crosslinker has a viscosity of from 5 to 1000 mPa·s at 25° C., alternatively 10 to 350 mPa·s.

Polyorganohydrogensiloxanes with an average of at least 3 silicon bonded hydrogen atoms per molecule for starting material (B) are exemplified by:

B-1) trimethylsiloxy-terminated poly(dimethyl/methylhydrogen)siloxane,

B-2) trimethylsiloxy-terminated polymethylhydrogensiloxane,

B-3) dimethylhydrogensiloxy-terminated poly(dimethyl/methylhydrogen)siloxane,

B-4) dimethylhydrogensiloxy-terminated polymethylhydrogensiloxane, and

B-5) a combination of two or more of B-1) to B-4). The crosslinker may be one polyorganohydrogensiloxane crosslinker or a combination of two or more crosslinkers that differ in one or more properties selected from molecular weight, structure, siloxane units and sequence.

Alternatively, starting material (B) in the release coating composition may comprise a clustered functional polyorganohydrogensiloxane. The clustered functional polyorganohydrogensiloxane has unit formula: $(R^5{}_2HSiO_{1/2})_{aa}$ $(R^5HSiO_{2/2})_{bb}(R^5{}_2SiO_{2/2})_{cc}(R^5SiO_{3/2})_{dd}(SiO_{4/2})_{ee}$ $((R^5{}_{ff})O_{(3-ff)/2}SiD^1SiR^5{}_{ff}O_{(3-ff)/2})_{gg}$.

In this unit formula, $R^5$ is as described above, and each $D^1$ independently represents a divalent hydrocarbon group of 2 to 18 carbon atoms. Suitable divalent hydrocarbon groups for $D^1$ are exemplified by the groups described above for $R^D$.

In the unit formula above, subscript aa≥0, subscript bb≥0, a quantity (aa+bb)≥4, subscript cc>0, subscript dd≥0, subscript ee≥0, subscript ff is 0, 1, or 2, subscript gg≥2. Alternatively, the quantity (aa+bb) may be ≥6. Alternatively, the quantity (aa+bb) may be ≥8. By the term "clustered functional polyorganohydrogensiloxane", it is meant that this compound has a linear or branched siloxane backbone structure and in the terminal and/or pendant positions of the clustered functional polyorganohydrogensiloxane there are silicon bonded hydrogen atoms spatially close to each other. The clustered functional polyorganohydrogensiloxane may have at least 4 total silicon bonded hydrogen atoms per molecule and at least two of them are in close proximity to each other, i.e., they are "clustered".

Alternatively, the clustered functional polyorganohydrogensiloxane may have formula:

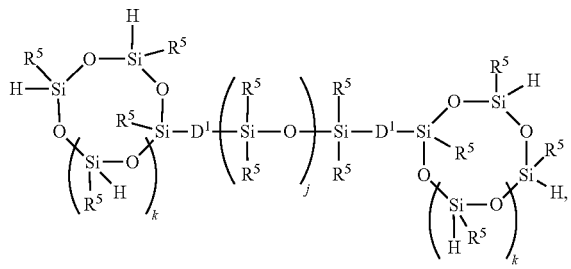

where $R^5$ and $D^1$ are as described above. Subscript j is 0 to 2,000,000, and each subscript k is independently 1 to 12 (i.e., such that each ring has 4 to 15 silicon atoms). Alternatively, subscript j is 5 to 500,000, alternatively 5 to 100,000, alternatively 5 to 50,000, alternatively 10 to 50,000, alternatively 10 to 10,000, alternatively 10 to 5,000, alternatively 20 to 2,000. Alternatively subscript k is 1 to 8, alternatively 1 to 6, alternatively 1 to 4, alternatively 1 to 2, and alternatively, k=1. Alternatively, B) the clustered functional polyorganohydrogensiloxane may have formula:

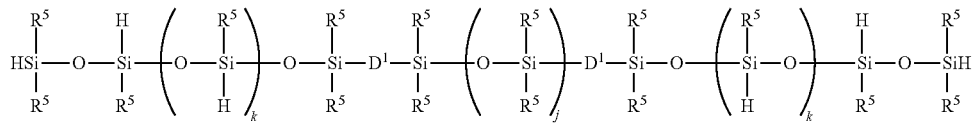

where $R^5$, $D^1$, and subscripts j and k are as described above.

The clustered functional polyorganohydrogensiloxane used herein may be a hydrosilylation reaction product of starting materials comprising:

a) a polyorganosiloxane having an average of at least two silicon bonded aliphatically unsaturated groups per molecule; and b) an organohydrogensiloxane having an average of 4 to 15 silicon atoms per molecule, where starting material b) has silicon bonded hydrogen atoms;

with the proviso that a molar ratio of aliphatically unsaturated groups in starting material a) to silicon bonded hydrogen atoms in starting material b) is 1 to 3 to 1 to 20. Clustered functional polyorganohydrogensiloxanes and method for their preparation are disclosed in U.S. Patent Application Publication 2016/0009865; U.S. Pat. Nos. 7,378,482; 7,429,636; 7,432,338; 7,449,536; and 7,906,605.

Starting material (B) may comprise a combination or two or more different polyorganohydrogensiloxanes that differ in at least one property such as structure, molecular weight, monovalent groups bonded to silicon atoms and SiH content. Please review this broad description of crosslinkers for release coating compositions.

Starting Material (C)

Starting material (C) in the release coating composition is a hydrosilylation reaction catalyst. Suitable hydrosilylation reaction catalysts for starting material (C) are as described above for starting material iii). The hydrosilylation reaction catalyst for the release coating composition may be the same as that used as starting material iii). Alternatively, a different hydrosilylation reaction catalyst may be used in the release coating composition.

Starting Material (D)

Starting material (D) in the release coating composition is a polyorganosiloxane containing at least two silicon-bonded aliphatically unsaturated groups per molecule; alternatively a polyorganosiloxane having an average, per molecule, of at least two silicon bonded groups having terminal aliphatic unsaturation. This polyorganosiloxane may be linear, branched, partly branched, cyclic, resinous (i.e., have a three-dimensional network), or may comprise a combination of different structures. The polyorganosiloxane may have average formula: $R^4{}_sSiO_{(4-s)/2}$, where each $R^4$ is independently selected from a monovalent hydrocarbon group or a monovalent halogenated hydrocarbon group, with the proviso that in each molecule, at least two of $R^4$ include terminal aliphatic unsaturation, and where subscript s is selected such that 0<s≤3.2. The average formula above for the polyorganosiloxane may be alternatively written as $(R^4_3SiO_{1/2})_t(R^4_2SiO_{2/2})_u(R^4SiO_{3/2})_v(SiO_{4/2})_w$, where subscripts t, u, v, and w are mole fractions, each independently with a value from ≥0 to ≤1, with the proviso that a quantity (t+u+v+w)=1. One of skill in the art understands how such units and their molar fractions influence subscript s in the average formula above. Trifunctional units (indicated by subscript v), Quadrifunctional units (indicated by subscript w) or both, are typically present in polyorganosiloxane resins, whereas Difunctional units, indicated by subscript u are typically present in polydiorganosiloxane polymers (and may also be present in polyorganosiloxane resins).

Each $R^4$ is independently selected, as introduced above, and may be linear, branched, cyclic, or combinations thereof. Cyclic hydrocarbon groups encompass aryl groups as well as saturated or non-conjugated cyclic groups. Aryl groups may be monocyclic or polycyclic. Linear and branched hydrocarbon groups may independently be saturated or unsaturated.

Halogenated hydrocarbon groups are hydrocarbon groups having one or more hydrogen atoms replaced (i.e., substituted) with a halogen atom such as chlorine, fluorine, bromine or iodine. Suitable monovalent hydrocarbon groups and monovalent halogenated hydrocarbon groups for $R^4$ are as described above for $R^5$.

In each molecule of (D) the polyorganosiloxane, at least two of $R^4$ include aliphatic unsaturation. Each $R^4$ including aliphatic unsaturation may be independently selected from an alkenyl group and an alkynyl group. Alkenyl groups for $R^4$ are exemplified by, but not limited to, vinyl, allyl, and hexenyl. The alkenyl group may have from 2 to 30 carbon atoms, alternatively from 2 to 24 carbon atoms, alternatively from 2 to 20 carbon atoms, alternatively from 2 to 12 carbon atoms, alternatively from 2 to 10 carbon atoms, alternatively from 2 to 6 carbon atoms. Alkynyl is exemplified by, but not limited to, ethynyl, propynyl, and butynyl. The alkynyl group may have from 2 to 30 carbon atoms, alternatively from 2 to 24 carbon atoms, alternatively from 2 to 20 carbon atoms, alternatively from 2 to 12 carbon atoms, alternatively from 2 to 10 carbon atoms, alternatively from 2 to 6 carbon atoms. Alternatively, (D) the polyorganosiloxane includes at least two silicon-bonded alkenyl groups per molecule and may be free from silicon-bonded alkynyl groups.

Alternatively, (D) the polyorganosiloxane may be substantially linear, alternatively is linear. The substantially linear polyorganosiloxane may have the average formula: $R^4_{s'}SiO_{(4-s')/2}$, where each $R^4$ and is as defined above, and where subscript s' is selected such that 1.9≤s'≤2.2.

At RT, the substantially linear polyorganosiloxane may be a flowable liquid or may have the form of an uncured rubber. The substantially linear polyorganosiloxane may have a viscosity of 10 mPa·s to 30,000,000 mPa·s, alternatively 10 mPa·s to 10,000 mPa·s, alternatively 100 mPa·s to 1,000,000 mPa·s, and alternatively 100 mPa·s to 100,000 mPa·s at 25° C. Viscosity may be measured via ASTM Standard D4287 using a Brookfield LV DV-E viscometer.

Alternatively, when (D) the polyorganosiloxane is substantially linear or linear, the polyorganosiloxane may have the average formula: $(R^{4"}_3SiO_{1/2})_m(R^{4"}_2SiO_{2/2})_n(R^4R^{4"}SiO_{2/2})_o(R^{4"}_2R^4SiO_{1/2})_p$, where each $R^{4"}$ is independently selected from a monovalent hydrocarbon group that is free of aliphatic unsaturation or a monovalent halogenated hydrocarbon group that is free of aliphatic unsaturation and each $R^{4'}$ is independently selected from a monovalent aliphatically unsaturated hydrocarbon group or a monovalent halogenated aliphatically unsaturated hydrocarbon group, as defined above for $R^4$, and subscript m≥0, subscript n≥0, subscript o≥2, and subscript p≥0, with the provisos that a quantity (m+p)≥2. Alternatively, m is 0 to 10, alternatively 2 to 10, alternatively 2 to 8, and alternatively 2 to 6. Alternatively, subscript n is 0 to 1,000, alternatively 1 to 500, and alternatively 1 to 200. Alternatively, subscript o is 2 to 500, alternatively 2 to 200, and alternatively 2 to 100. Alternatively, p is 0 to 10, alternatively 2 to 10, alternatively 2 to 8, and alternatively 2 to 6.

When (D) the polyorganosiloxane is substantially linear, alternatively is linear, the at least two aliphatically unsaturated groups may be bonded to silicon atoms in pendant positions, terminal positions, or in both pendant and terminal positions. As a specific example of the polyorganosiloxane having pendant silicon-bonded aliphatically unsaturated groups, starting material (D) may have the average unit formula: $[(CH_3)_3SiO]_2[(CH_3)_2SiO]_n[(CH_3)ViSiO]_o$, where subscripts n and o are defined above. With regard to this average formula, any methyl group may be replaced with a different monovalent hydrocarbon group (such as alkyl or aryl), and any vinyl group may be replaced with a different aliphatically unsaturated monovalent hydrocarbon group (such as allyl or hexenyl). Alternatively, as a specific example of (D) the polyorganosiloxane having terminal silicon-bonded aliphatically unsaturated groups, starting material (D) may have the average formula: $Vi(CH_3)_2SiO[(CH_3)_2SiO]_nSi(CH_3)_2Vi$, where subscript n is as defined above. The dimethyl polysiloxane terminated with silicon-bonded vinyl groups may be used alone or in combination with the dimethyl, methyl-vinyl polysiloxane disclosed immediately above. With regard to this average formula, any methyl group may be replaced with a different monovalent hydrocarbon group, and any vinyl group may be replaced with any aliphatically unsaturated monovalent hydrocarbon group. Because the at least two silicon-bonded aliphatically unsaturated groups may be both pendant and terminal, (D) the polyorganosiloxane may alternatively have the average unit formula: $[Vi(CH_3)_2SiO]_2[(CH_3)_2SiO]_n[(CH_3)ViSiO]_oSiVi$, where subscripts n and o are defined above.

The substantially linear polyorganosiloxane can be exemplified by a dimethylpolysiloxane capped at both molecular terminals with dimethylvinylsiloxy groups, a methylphenylpolysiloxane capped at both molecular terminals with dimethylvinylsiloxy groups, a copolymer of a methylphenylsiloxane and dimethylsiloxane capped at both molecular terminals with dimethylvinylsiloxy groups, a copolymer of a methylvinylsiloxane and a methylphenylsiloxane capped at both molecular terminals with dimethylvinylsiloxy groups, a copolymer of a methylvinylsiloxane and diphenylsiloxane capped at both molecular terminals with dimethylvinylsiloxy groups, a copolymer of a methylvinylsiloxane, methylphenylsiloxane, and dimethylsiloxane capped at both molecular terminals with dimethylvinylsiloxy groups, a copolymer of a methylvinylsiloxane and a methylphenylsiloxane capped at both molecular terminals with trimethylsiloxy groups, a copolymer of a methylvinylsiloxane and diphenylsiloxane capped at both molecular terminals with trimethylsiloxy groups, and a copolymer of a methylvinylsiloxane, methylphenylsiloxane, and a dimethylsiloxane capped at both molecular terminals with trimethylsiloxy groups.

Starting materials (A), (B), (C), and (D) may be added in amounts sufficient to render the release coating composition curable to form a release coating. The release coating composition may comprise (A) the controlled release additive in an amount of 1% to 75%, alternatively 5% to 25% based on combined weights of starting materials (A), (B), (C), and (D). Starting material (B) the polyorganohydrogensiloxane may be present in an amount of 0.1% to 5%, alternatively 0.2% to 5%, based on combined weights of starting materials (A), (B), (C), and (D). Starting material (C) the hydrosilylation reaction catalyst is present in a catalytically effective amount. The catalytically effective amount is sufficient to catalyze hydrosilylation reaction, and may be an amount sufficient to provide 5 ppm to 300 ppm, alternatively 5 ppm to 100 ppm, of platinum group metal based on combined weights of stating materials (A), (B), (C), and (D). Starting material (D) the organopolysiloxane having at least two silicon-bonded aliphatically unsaturated groups per molecule may be present in an amount of from 20% to 98%, alternatively 75% to 90%, based on combined weights of starting materials (A), (B), (C), and (D). The starting materials may be added in amounts sufficient to provide a molar ratio of silicon-bonded hydrogen atoms to silicon-bonded aliphatically unsaturated groups of starting materials (A), (B), (C), and (D) combined is 1:1 to 2.5:1, alternatively 1.3:1 to 1.5:1 (overall SiH:Vi ratio).

Starting Material (E) Solvent

Starting material (E) is a solvent as described above for starting material v). The polysiloxane may be prepared in the solvent for starting material v), and may be delivered to the release coating composition in a solution with said solvent. Starting material (E), the solvent used in the release coating composition may be the same as the solvent selected for starting material v). Alternatively, the solvent may be a different solvent than that described above in preparation of the polysiloxane, and may be in addition to said solvent for starting material v). The amount of solvent in the release coating composition depends on various factors including the type and amount of starting materials (A) to (D) selected and whether any additional starting materials are added to the composition, and the amount of starting material v) used to deliver starting material (A), however the amount of solvent may be up to 99%, alternatively 20% to 99%, alternatively 50% to 95%, alternatively 70% to 90%, and alternatively 80% to 90%, based on combined weights of starting materials (A) to (E) in the release coating composition.

Starting Material F) Hydrosilylation Reaction Inhibitor

Starting material F) is a hydrosilylation reaction inhibitor (inhibitor) that may optionally be used for altering rate of reaction of the silicon bonded hydrogen atoms of starting material (B) and the aliphatically unsaturated hydrocarbon groups of stating material (A), as compared to reaction rate of the same starting materials but with the inhibitor omitted. Inhibitors are exemplified by acetylenic alcohols such as methyl butynol, ethynyl cyclohexanol, dimethyl hexynol, and 3,5-dimethyl-1-hexyn-3-ol, 1-butyn-3-ol, 1-propyn-3-ol, 2-methyl-3-butyn-2-ol, 3-methyl-1-butyn-3-ol, 3-methyl-1-pentyn-3-ol, 3-phenyl-1-butyn-3-ol, 4-ethyl-1-octyn-3-ol, 3,5-dimethyl-1-hexyn-3-ol, and 1-ethynyl-1-cyclohexanol, and a combination thereof; cycloalkenylsiloxanes such as methylvinylcyclosiloxanes exemplified by 1,3,5,7-tetramethyl-1,3,5,7-tetravinylcyclotetrasiloxane, 1,3,5,7-tetramethyl-1,3,5,7-tetrahexenylcyclotetrasiloxane, and a combination thereof; ene-yne compounds such as 3-methyl-3-penten-1-yne, 3,5-dimethyl-3-hexen-1-yne, and a combination thereof; triazoles such as benzotriazole; phosphines; mercaptans; hydrazines; amines, such as tetramethyl ethylenediamine, 3-dimethylamino-1-propyne, n-methyl-propargylamine, propargylamine, and 1-ethynylcyclohexylamine; dialkyl fumarates such as diethyl fumarate, dialkenyl fumarates such as diallyl fumarate, dialkoxyalkyl fumarates, maleates such as diallyl maleate and diethyl maleate; nitriles; ethers; carbon monoxide; alkenes such as cyclo-octadiene, divinyltetramethyldisiloxane; alcohols such as benzyl alcohol; and a combination thereof.

Alternatively, starting material iv) may be a silylated acetylenic compound. Without wishing to be bound by theory, it is thought that adding a silylated acetylenic compound reduces yellowing of the reaction product prepared from hydrosilylation reaction as compared to a reaction product from hydrosilylation of starting materials that do not include a silylated acetylenic compound or that include an organic acetylenic alcohol inhibitor, such as those described above.

The silylated acetylenic compound is exemplified by (3-methyl-1-butyn-3-oxy)trimethylsilane, ((1,1-dimethyl-2-propynyl)oxy)trimethylsilane, bis(3-methyl-1-butyn-3-oxy)dimethylsilane, bis(3-methyl-1-butyn-3-oxy)silanemethylvinylsilane, bis((1,1-dimethyl-2-propynyl)oxy)dimethylsilane, methyl(tris(1,1-dimethyl-2-propynyloxy))silane, methyl(tris(3-methyl-1-butyn-3-oxy))silane, (3-methyl-1-butyn-3-oxy)dimethylphenylsilane, (3-methyl-1-butyn-3-oxy)dimethylhexenylsilane, (3-methyl-1-butyn-3-oxy)triethylsilane, bis(3-methyl-1-butyn-3-oxy)methyltrifluoropropylsilane, (3,5-dimethyl-1-hexyn-3-oxy)trimethylsilane, (3-phenyl-1-butyn-3-oxy)diphenylmethylsilane, (3-phenyl-1-butyn-3-oxy)dimethylphenylsilane, (3-phenyl-1-butyn-3-oxy)dimethylvinylsilane, (3-phenyl-1-butyn-3-oxy)dimethylhexenylsilane, (cyclohexyl-1-ethyn-1-oxy)dimethylhexenylsilane, (cyclohexyl-1-ethyn-1-oxy)dimethylvinylsilane, (cyclohexyl-1-ethyn-1-oxy)diphenylmethylsilane, (cyclohexyl-1-ethyn-1-oxy)trimethylsilane, and combinations thereof. Alternatively, the silylated acetylenic compound is exemplified by methyl(tris(1,1-dimethyl-2-propynyloxy))silane, ((1,1-dimethyl-2-propynyl)oxy)trimethylsilane, or a combination thereof. The silylated acetylenic compound useful as the inhibitor herein may be prepared by methods known in the art, for example, U.S. Pat. No. 6,677,740 discloses silylating an acetylenic alcohol described above by reacting it with a chlorosilane in the presence of an acid receptor.

The amount of inhibitor added herein will depend on various factors including the desired reaction rate, the particular inhibitor used, and the selection and amount of starting materials (A) and (B). However, when present, the amount of inhibitor may range from >0% to 1%, alternatively >0% to 5%, alternatively 0.001% to 1%, alternatively 0.01% to 0.5%, alternatively 0.002% to 0.15%, and alternatively 0.0025% to 0.025%, based on the combined weights of all starting materials used to prepare the polysiloxane.

Starting Material (G) Anchorage Additive

Starting material (G) is an anchorage additive that may optionally be added to the release coating composition. Suitable anchorage additives are exemplified by a reaction product of a vinyl alkoxysilane and an epoxy-functional alkoxysilane; a reaction product of a vinyl acetoxysilane and epoxy-functional alkoxysilane; and a combination (e.g., physical blend and/or a reaction product) of a polyorganosiloxane having at least one aliphatically unsaturated hydrocarbon group and at least one hydrolyzable group per molecule and an epoxy-functional alkoxysilane (e.g., a combination of a hydroxy-terminated, vinyl functional polydimethylsiloxane with glycidoxypropyltrimethoxysilane). Suitable anchorage additives and methods for their preparation are disclosed, for example, in U.S. Pat. No. 9,562,149;

U.S. Patent Application Publication Numbers 2003/0088042, 2004/0254274, and 2005/0038188; and European Patent 0 556 023. The exact amount of anchorage additive depends on various factors including the type of substrate and whether a primer is used, however, the amount of anchorage additive in the release coating composition may be 0 to 2 parts by weight, per 100 parts by weight of starting material (D). Alternatively, the amount of anchorage additive, may be 0.01 to 2 parts by weight, per 100 parts by weight of starting material (D).

Starting Material (H) Anti-Mist Additive

Starting material (H) is an anti-mist additive that may be added to the release coating composition to reduce or suppress silicone mist formation in coating processes, particularly with high speed coating equipment. The anti-mist additive may be a reaction product of an organohydrogensilicon compound, an oxyalkylene compound or an organoalkenylsiloxane with at least three silicon bonded alkenyl groups per molecule, and a suitable catalyst. Suitable anti-mist additives are disclosed, for example, in U.S. Patent Application 2011/0287267; U.S. Pat. Nos. 8,722,153; 6,586,535; and 5,625,023. The amount of anti-mist additive will depend on various factors including the amount and type of other starting materials selected for the release coating composition. However, the amount of anti-mist additive may be 0% to 10%, alternatively 0.1% to 3%, based on the weight of all starting materials in the release coating composition.

The release coating composition may further comprise one or more optional additives such as colorants, dyes, pigments, fillers, for example, silica, quartz or chalk, reactive diluents, preservatives, and/or fragrances. Alternatively, the release coating may be free of particulates (such as fillers) or contains only a limited amount of particulate, such as 0 to 30% by weight of the release coating composition. Without wishing to be bound by theory, it is thought that fillers can agglomerate or otherwise stick to the coater equipment used to apply the release coating. They can hinder optical properties, for example transparency, of the release coating and of the release liner formed therewith, if optical transparency is desired. The particulates may be prejudicial to the adherence of an adherend (such as an adhesive tape or label).

When selecting starting materials for the release coating composition, there may be overlap between types of starting materials because certain starting materials described herein may have more than one function. Certain particulates may be useful as fillers and as pigments, and even as flame retardants, e.g., carbon black. When adding additional starting materials to the composition, the additional starting materials are distinct from starting materials (A) to (D) and from one another. Alternatively, the release coating composition may consist of only starting materials (A)-(D), alternatively only starting materials (A)-(E), and alternatively starting materials (A)-(F). Alternatively, the release coating composition may consist of only starting materials (A)-(D) and one or both of (G) and/or (H). Alternatively, the release coating composition may consist of only starting materials (A)-(E) and one or both of (G) and/or (H). Alternatively, the release coating composition may consist of only starting materials (A)-(F) and one or both of (G) and/or (H).

The release coating composition may be free from fluoroorganosilicone compounds. It is believed that, during the cure, a fluorocompound, because of its low surface tension, will rapidly migrate to the interface of a coating composition and a substrate, for example a polyorganosiloxane release coating composition/PET film interface, and prevent adherence of the release coating (prepared by curing the release coating composition) to the substrate by making a fluorine containing barrier. By making a barrier, the fluorocompound prevents any component from reacting at the interface. Moreover, fluorosilicone compounds are usually expensive.

Preparing the Release Coating Composition

The release coating composition may be prepared by combining starting materials comprising (A), (B), (C) and (D), along with any optional additional starting materials such as (E), (F), (G) and/or (H), in any order of addition, optionally with a master batch, and optionally under shear. The release coating composition may be prepared by mixing the starting materials together, for example, to prepare a one part composition. However, it may be desirable to prepare a release coating composition as a multiple part composition, in which starting materials (B) and (C) are stored in separate parts, until the parts are combined at the time of use (e.g., shortly before application to a substrate).

For example, a multiple part composition may comprise:

Part (A) a base part comprising at least a portion of (D) the polyorganosiloxane having an average, per molecule, of at least 2 silicon bonded hydrocarbon groups having aliphatic unsaturation and (C) the hydrosilylation reaction catalyst, and when present, one or more of, (E) solvent, (F) the inhibitor, (G) the anchorage additive, and (H) the anti-mist additive, and Part (B) a curing agent part comprising at least a portion of (D) the polyorganosiloxane having an average, per molecule, of at least 2 silicon bonded hydrocarbon groups having aliphatic unsaturation and (B) the polyorganohydrogensiloxane, and when present (F) the inhibitor, (G) the anchorage additive, (E) the solvent, or two or more of (E), (F), and (G).

Starting material (A), the controlled release additive may be added to either Part (A), Part (B), or both. Part (A) and Part (B) may be combined in a weight ratio (A):(B) of 1:1 to 10:1, alternatively 1:1 to 5:1, and alternatively 1:1 to 2:1. Part (A) and Part (B) may be provided in a kit with instructions, e.g., for how to combine the parts to prepare the release coating composition, how to apply the release coating composition to a substrate, and how to cure the release coating composition.

Alternatively, when the anchorage additive is present, it can be incorporated in either of Part (A) or Part (B), or it can be added in a separate (third) part.

The present invention also provides a process of preparing a release liner with the release coating composition. The method comprises applying the release coating composition on a surface of a substrate. The method further comprises curing the release coating composition to form a release coating on the surface of the substrate.

The method for preparing the release liner may further comprise: treating the surface of the substrate before applying the release coating composition to the surface the substrate. Treating the substrate may be performed by any convenient means such as a plasma treatment or a corona discharge treatment. Alternatively, the substrate may be treated by applying a primer. In certain instances anchorage of the release coating may be improved if the substrate treated before coating.

The method for forming the release liner may further comprise: removing solvent, which may be performed by any conventional means, such as heating at 50° C. to 100° C. for a time sufficient to remove all or a portion of the solvent after application of the release coating composition to the surface of the substrate and before and/or during curing the release coating composition. The method further comprises curing the release coating composition to form the release coating on the surface of the substrate. Curing may be performed by heating at an elevated temperature, e.g., 50° C. to 200° C., alternatively 50° C. to 180° C., alternatively 50° C. to 120° C., and alternatively 50° C. to 90° C. to give the release liner. One skilled in the art would be able to select an appropriate temperature depending on various factors including the selection of optional starting materials in the release coating composition and the substrate material of construction. Alternatively, curing may be performed by heating at 100° C. to 200° C.

Under production coater conditions, cure can be effected in a residence time of 1 second to 6 seconds, alternatively from 1.5 seconds to 3 seconds, at an air temperature of 120° C. to 150° C. Heating for the solvent removal and curing steps can be performed in an oven, e.g., an air circulation oven or tunnel furnace or by passing the coated substrate around heated cylinders.

The release coating composition may be applied (e.g., disposed or dispensed) on the surface of the substrate in any suitable manner. Typically, the release coating composition is applied in wet form via a wet coating technique. Alternatively, the release coating composition may be applied by i) spin coating; ii) brush coating; iii) drop coating; iv) spray coating; v) dip coating; vi) roll coating; vii) flow coating; viii) slot coating; ix) gravure coating; x) Meyer bar coating; or xi) a combination of any of i) to x). Alternatively, the release coating composition can be applied to the surface of the substrate by a means selected from the group consisting of spraying, doctor blade, dipping, screen printing or by a roll coater, e.g. an offset web coater, kiss coater or etched cylinder coater.

The substrate is not limited and may be any substrate suitable for forming a release liner. The release coating (formed by curing the release coating composition) may be physically and/or chemically bonded to the substrate depending on its selection. The substrate may have an integrated hot plate or an integrated or stand-alone furnace for curing the deposit. The substrate may optionally have a continuous or non-continuous shape, size, dimension, surface roughness, and other characteristics. Alternatively, the substrate may have a softening point temperature at the elevated temperature. However, the release coating composition and method are not so limited.

The substrate may comprise a plastic, which maybe a thermosetting and/or thermoplastic. However, the substrate may alternatively be glass, metal, paper, cardboard, paperboard, a silicone, or polymeric materials, or a combination thereof.

Specific examples of suitable substrates include paper substrates such as Kraft paper, and polyethylene coated Kraft paper (PEK coated paper); polymeric substrates such as polyamides (PA); polyesters such as polyethylene terephthalates (PET), polybutylene terephthalates (PET), polytrimethylene terephthalates (PTT), polyethylene naphthalates (PEN), and liquid crystalline polyesters; polyolefins such as polyethylenes (PE), polypropylenes (PP), and polybutylenes; styrenic resins; polyoxymethylenes (POM); polycarbonates (PC); polymethylenemethacrylates (PMMA); polyvinyl chlorides (PVC); polyphenylene sulfides (PPS); polyphenylene ethers (PPE); polyimides (PI); polyamideimides (PAI); polyetherimides (PEI); polysulfones (PSU); polyethersulfones; polyketones (PK); polyetherketones; polyvinyl alcohols (PVA); polyetheretherketones (PEEK); polyetherketoneketones (PEKK); polyarylates (PAR); polyethernitriles; phenolic resins; phenoxy resins; celluloses such as triacetylcellulose, diacetylcellulose, and cellophane; fluorinated resins, such as polytetrafluoroethylenes; thermoplastic elastomers, such as polystyrene types, polyolefin types, polyurethane types, polyester types, polyamide types, polybutadiene types, polyisoprene types, and fluoro types; and copolymers, modifications, and combinations thereof. Alternatively, the substrate may comprise a polymer film substrate selected from the group consisting of polyester, particularly polyethylene terephthalate (PET), polyethylene, polypropylene, or polystyrene films; or the substrate may comprise a paper substrate, including plastic coated paper, for example paper coated with polyethylene, glassine, super calender paper, or clay coated Kraft. The release coating composition can alternatively be applied to a metal foil substrate, for example aluminum foil. Alternatively, the substrate may be PET.

The release coating composition, or wet deposit, on the substrate may be cured at the elevated temperature for a period of time. The period of time is typically sufficient to effect curing of the release coating composition. Alternatively, the period of time is >0 to 8 hours, alternatively >0 to 2 hours, alternatively >0 to 1 hour, alternatively >0 to 30 minutes, alternatively >0 to 15 minutes, alternatively >0 to 10 minutes, alternatively >0 to 5 minutes, alternatively >0 to 2 minutes. The period of time depends on various factors including on the elevated temperature is utilized, the temperature selected, desired film thickness, and the presence of absence of any water or carrier vehicle in the curable composition.

Curing the release coating composition typically has a dwell time of 0.1 second to 50 seconds; alternatively 1 second to 10 seconds; and alternatively 0.5 second to 30 seconds. Dwell time selected may depend on the substrate selection, temperature selected, and line speed. Dwell time, as used herein, refers to the time during which the release coating composition, or wet deposit, is subjected to the elevated temperature. Dwell time is distinguished from cure time, as there may be ongoing curing even after the release coating composition, wet deposit, or partially cured reaction intermediary thereof is no longer subjected to the elevated temperature, which typically initiates curing. Alternatively, the coated substrate is prepared on a conveyor belt in an oven, and the dwell time may be calculated by dividing a length of the oven (e.g., in meters) by a line speed of the conveyor belt (e.g., in meters/sec).

The period of time may be broken down into cure iterations, e.g., a first-cure and a post-cure, with the first-cure being, for example, one hour and the post cure being, for example, three hours. The elevated temperature may be independently selected from any temperature above room temperature in such iterations, and may be the same in each iteration.

Depending on a thickness and other dimensions of the film of release coating composition and coated substrate, the coated substrate can be formed via an iterative process. For example, a first deposit may be formed and subjected to a first elevated temperature for a first period of time to give a partially cured deposit. Then, a second deposit may be disposed on the partially cured deposit and subjected to a second elevated temperature for a second period of time to give a second partially cured deposit. The partially cured deposit will also further cure during exposure to the second elevated temperature for the second period of time. A third deposit may be disposed on the second partially cured deposit and subjected to a third elevated temperature for a third period of time to give a third partially cured deposit. The second partially cured deposit will also further cure during exposure to the second elevated temperature for the second period of time. This process may be repeated, for example, from 1 to 50 times, to build the coated article as desired. A composite of partially cured layers may be subjected to a final post-cure, e.g., at the elevated temperature and period of time above. Each elevated temperature and period of time may be independently selected and may be the same as or different from one another. When the article is formed via the iterative process, each deposit may also be independently selected and may differ in terms of starting materials selected in the curable composition, their amounts, or both. Alternatively still, each iterative layer may be fully cured, rather than only being partially cured, in such an iterative process.

Alternatively, the deposit comprises a wet film. The iterative process may be wet-on-wet, depending on a cure state of the partially cured layer. Alternatively, the iterative process may be wet-on-dry.

The release liner, which comprises the release coating formed from curing the release coating composition on the surface the substrate, may have varying dimensions, including relative thicknesses of the release coating and the substrate. The release coating has a thickness that may vary depending upon its end use application. The release coating may have a thickness of >0 to 4,000 μm, alternatively >0 to 3,000 μm, alternatively >0 to 2,000 μm, alternatively >0 to 1,000 μm, alternatively >0 to 500 μm, alternatively >0 to 250 μm. However, other thicknesses are contemplated, e.g. 0.1 am to 200 μm. For example, the thickness of the release coating may be 0.2 μm to 175 μm; alternatively 0.5 μm to 150 μm; alternatively 0.75 to 100 μm; alternatively 1 to 75 μm; alternatively 2 to 60 μm; alternatively 3 to 50 μm; alternatively 4 μm to 40 μm; alternatively any one of 1, 2, 3, 4, 5, 6, 7, 8, 9, 10, 15, 20, 25, 30, 35, 40, 45, 50, 60, 70, 75, 80, 90, 100, 150, 175, and 200 μm. When the substrate is plastic, the release coating may have a thickness of >0 to 200 μm, alternatively >0 to 150 μm, alternatively >0 to 100, am.

The release liner prepared as described above is useful for a tape or adhesive, including any pressure-sensitive adhesives, including acrylic resin-type pressure-sensitive adhesives, rubber-type pressure-sensitive adhesives, and silicone-type pressure-sensitive adhesives, as well as acrylic resin-type adhesives, synthetic rubber-type adhesives, silicone-type adhesives, epoxy resin-type adhesives, and polyurethane-type adhesives. Each major surface of the substrate may have a release coating disposed thereon for double sided tapes or adhesives.

EXAMPLES

These examples are intended to illustrate the invention to one skilled in the art and are not to be interpreted as limiting the scope of the invention set forth in the claims. The materials in Table 1 were used in these examples.

TABLE 1

| Material | Description | Source |
|---|---|---|
| MQM$^{Vi}$ Resin | Resin of unit formula $(Me_3SiO_{1/2})_{40}(Me_2ViSiO_{1/2})_4(SiO_{4/2})_{56}$ | Dow Silicones Corporation |
| SiH Terminated Oligomer | 1,1,3,3-tetramethyldisiloxane | DOWSIL ™ 3-7010 INTERMEDIATE |
| SiH Terminated PDMS | polydimethylsiloxane terminated with dimethylhydrogensiloxy groups. | DOWSIL ™ Q2-5057S |
| Catalyst 1 | platinum group metal catalyst | SYL-OFF ™ 4000 Catalyst from Dow Silicones Corporation |
| Solvent 1 | toluene | from SK Corp in Korea |
| Solvent 2 | heptane | from Dae Jung in Korea |
| Solvent 3 | xylene/toluene | MQM$^{Vi}$ Resin is supplied in this solvent |
| Crosslinker 1 | trimethylsiloxy-terminated polymethylhydrogensiloxane | DOWSIL ™ 7682-000 Crosslinker |
| Base Polymer 1 | 99.8% dimethylvinylsiloxy-terminated poly(dimethyl/methylvinyl)siloxane | SYL-OFF ™ 7226 Dispersion |
| Inhibitor 1 | 0.2% Methyl Butynol | |
| TESA ™ 7475 | TESA ™ 7475 test tape having an acrylic adhesive | TESA SE of Germany |

DOWSIL™ and SYL-OFF™ materials are available from Dow Silicones Corporation.

Reference Example 1—Preparation of Polysiloxane

The following starting materials combined to form a mixture: 100 parts of MQM$^{Vi}$ Resin, 5 parts Solvent 1, and sufficient Catalyst 1 to provide 1-2 ppm platinum group metal in the mixture. The resulting mixture was heated to 80° C. An amount of SiH Terminated Oligomer or SiH Terminated PDMS sufficient to provide an SiH/Vi ratio of >0.2 to 0.3 was metered into the mixture over 1 hour. The samples prepared are summarized in Table 2, below. The amounts of the starting materials are in weight parts.

TABLE 2

| | Starting Materials for Synthesizing Polysiloxanes | | | |
|---|---|---|---|---|
| Starting Material | Polysiloxane # 2 | Polysiloxane # 4 | Polysiloxane # 5 | Polysiloxane # 6 |
| MQM$^{Vi}$ Resin | 100 | 100 | 100 | 100 |
| SiH Terminated Oligomer | 0 | 0 | 1.43 | 1 |

TABLE 2-continued

| Starting Materials for Synthesizing Polysiloxanes | | | | |
|---|---|---|---|---|
| Starting Material | Polysiloxane # 2 | Polysiloxane # 4 | Polysiloxane # 5 | Polysiloxane # 6 |
| SiH Terminated PDMS | 14.16 | 10 | 0 | 0 |
| Catalyst 1 | 0.04 | 0.04 | 0.03 | 0.03 |
| Solvent 1 | 5 | 5 | 15 | 5 |
| SiH/Vi Ratio | 0.4 | 0.3 | 0.4 | 0.3 |
| Pt group metal amount (ppm) | 1.74 | 1.81 | 1.34 | 1.47 |

The resulting samples were polysiloxanes dissolved in solvent.

Reference Example 2—Preparation of Release Coating Compositions

Release coating compositions were prepared. Comparative Bath 1 had no controlled release additive as a control. Comparative Baths 2 and 3 included a polyorganosilicate resin as a comparative controlled release additive. Baths 4 to 11 included a polysiloxane from Table 2 used as a controlled release additive (CRA). The release coating compositions were prepared by mixing the controlled release additive (when present), Base Polymer 1, Inhibitor 1, Crosslinker 1, and Catalyst 1 in amounts shown below in Table 3 (Comparative) and Table 4 (Working). Amounts of each starting material were weight parts. Each Bath had a SiH/Vi ratio of 1.5:1.

TABLE 3

| Comparative Release Coating Compositions | | | |
|---|---|---|---|
| | Bath # | | |
| | 1 | 2 | 3 |
| Base Polymer 1 | 19.96 | 17.67 | 15.968 |
| Inhibitor 1 | 0.04 | 0.036 | 0.032 |
| Crosslinker 1 | 0 | 0.08 | 0.16 |
| Catalyst 1 | 0.2 | 0.2 | 0.2 |
| MQM$^{Vi}$ Resin (unreacted polyorganosilicate resin) | 0 | 1.4 | 2.8 |
| Solvent 1 | 40 | 40 | 40 |
| Solvent 2 | 60 | 60 | 60 |
| Solvent 3 | 0 | 0.6 | 1.2 |

TABLE 4

| Release Coating Compositions | | | | | | | | |
|---|---|---|---|---|---|---|---|---|
| | Bath # | | | | | | | |
| | 4 | 5 | 6 | 7 | 8 | 9 | 10 | 11 |
| Base Polymer 1 | 17.967 | 15.968 | 17.967 | 15.968 | 17.967 | 15.968 | 17.967 | 15.968 |
| Inhibitor 1 | 0.036 | 0.032 | 0.036 | 0.032 | 0.036 | 0.032 | 0.036 | 0.032 |
| Crosslinker 1 | 0.08 | 0.16 | 0.08 | 0.16 | 0.08 | 0.16 | 0.08 | 0.16 |
| Catalyst 1 | 0.2 | 0.2 | 0.2 | 0.2 | 0.2 | 0.2 | 0.2 | 0.2 |
| Polysiloxane #2 | 1.4 | 2.8 | 0 | 0 | 0 | 0 | 0 | 0 |
| Polysiloxane #4 | 0 | 0 | 1.4 | 2.8 | 0 | 0 | 0 | 0 |
| Polysiloxane #5 | 0 | 0 | 0 | 0 | 1.2 | 2.5 | 0 | 0 |
| Polysiloxane #6 | 0 | 0 | 0 | 0 | 0 | 0 | 1.3 | 2.7 |
| Solvent 1 | 40 | 40 | 40 | 40 | 40 | 40 | 40 | 40 |
| Solvent 2 | 60 | 60 | 60 | 60 | 60 | 60 | 60 | 60 |
| Solvent 3 | 0.6 | 1.2 | 0.6 | 1.2 | 0.8 | 1.5 | 0.7 | 1.3 |

Reference Example 3—Preparation and Testing of Release Liners

The release coating compositions in Tables 3 and 4 were coated on PET substrates with a Mayer Bar #5. The resulting coated substrates were heated at 130° C. for 10 seconds to remove solvent and cure the release coating compositions, thereby forming release liners having a release coating on a surface of the PET substrate. Samples were aged. Thereafter, a 1 inch TESA™ 7475 tape was stuck to the release coating. Samples were aged and then release force was measured by a 180 degree peel test by peeling at 0.3 m/minute using an AR-1000 from Cheminstrument Company. In Table 5 below, 1R-1R indicated that samples were aged 1 day at RT after coating, and then releasing force was measured after 1 day at RT with TESA™ 7475 tape; and 1R-1H indicated that samples were left 1 day at RT after coating, and then release force was measured after 1 day at high temp (50° C.) with TESA™ 7475 tape; 34R-1R indicated that samples were aged 34 days at RT after coating, and then releasing force was measured after 1 day at RT with TESA™ 7475 tape, and 34R-1H indicated that samples were left 34 days at RT after coating, and then release force was measured after 1 day at high temp (50° C.) with TESA™ 7475 tape. Each sample was tested 3 times, and the results were averaged. The averages are shown in Table 5.

TABLE 5

Release Force

| | Bath # | | | | | | | | | | |
|---|---|---|---|---|---|---|---|---|---|---|---|
| | 1 | 2 | 3 | 4 | 5 | 6 | 7 | 8 | 9 | 10 | 11 |
| 1R-1R | 16 | 29 | 55 | 45 | 120 | 39 | 83 | 55 | 225 | 39 | 98 |
| 1R-1H | 22 | 39 | 77 | 69 | 242 | 51 | 151 | 80 | 319 | 58 | 135 |
| 34R-1R | 28 | 28 | 49 | 31 | 59 | 28 | 54 | 35 | 147 | 26 | 60 |
| 34R-1H | 31 | 32 | 57 | 42 | 95 | 33 | 83 | 44 | 247 | 33 | 73 |

Comparing the release force results for Bath #2 (which contained 2 parts of a vinyl functional polyorganosilicate resin described as an example of starting material i) instead of the polysiloxane prepared as described herein) with Bath #s 4, 6, 8, and 10, which each contained 2 parts of a polysiloxane prepared as described herein showed that each release liner including a release coating prepared from Bath #s 4, 6, 8, and 10 on PET had higher release force than the comparative release coating that did not include the polysiloxane prepared as described herein when tested after the same aging conditions. Furthermore, comparing the release force results for Bath #3 (which contained 4 parts of the vinyl functional polyorganosilicate resin described as an example of starting material i) instead of the polysiloxane prepared as described herein) with Bath #s 5, 7, 8, and 11, which each contained 4 parts of a polysiloxane prepared as described herein showed that each release liner including a release coating prepared from Bath #s 5, 7, 8, and 11 on PET had higher release force than the comparative release coating that did not include the polysiloxane prepared as described herein when tested after the same aging conditions.

Comparative Example 4

A polyorganosiloxane was prepared by the condensation reaction method of U.S. Pat. No. 8,933,177 using MQM$^{Vi}$ Resin and a hydroxyl terminated polydimethylsiloxane with a DP 100 as starting materials. This comparative polysiloxane was formulated into release coating compositions, which are summarized below in Table 5. Each Bath had a SiH/Vi ratio of 1.5:1.

TABLE 5

Release Coating Compositions with Comparative Additive

| | Bath # | |
|---|---|---|
| | 12 | 13 |
| Base Polymer 1 | 14.7704 | 9.6808 |
| Inhibitor 1 | 0.0296 | 0.0192 |
| Crosslinker 1 | 0.24 | 0.48 |
| Catalyst 1 | 0.25 | 0.25 |
| Comparative polyorganosiloxane | 5.2 | 10.4 |
| Solvent 1 | 50 | 70 |
| Solvent 2 | 75 | 100 |

Release liners were prepared and tested according to the methods of Reference Example 3, but using the comparative release coating compositions in Table 5. The results are shown below in Table 6.

TABLE 6

Release Force of Comparative Release Coatings

| | Bath # | |
|---|---|---|
| | 12 | 13 |
| 1R-1R | 66 | 85 |
| 1R-1H | 95 | 113 |
| 34R-1R | NA | NA |
| 34R-1H | NA | NA |

'NA' means these test results were not available.

Reference Example 5—Migration and Cure

The release coatings prepared as described above were evaluated for sustained adhesion strength (SAS). SAS was evaluated by rubbing a finger on the release coating to judge the amount of smear and rub off of the release coating from the substrate. The results are in Table 7, below.

TABLE 7

| | Bath # | | | | | | | | | | | | |
|---|---|---|---|---|---|---|---|---|---|---|---|---|---|
| | C1 | C2 | C3 | 4 | 5 | 6 | 7 | 8 | 9 | 10 | 11 | C12 | C13 |
| SAS | 96 | 96 | 93 | 98 | 97 | 97 | 96 | 97 | 96 | 94 | 95 | 93 | 94 |

Comparing the SAS values for release coatings prepared from comparative bath 12 with release coatings prepared from Baths 4, 6, 8, and 10 showed that each of baths 4, 6, 8, and 10 produced a release coating with better (higher) SAS values than comparative bath 12. Comparing the SAS values for release coatings prepared from comparative bath 13 with release coatings prepared from baths 5, 7, 9, and 11 showed that each of baths 5, 7, 9, and 11 produced a release coating with better SAS values than comparative bath 13.

INDUSTRIAL APPLICABILITY

The examples and comparative examples above showed that release coating compositions containing the new polysiloxane described herein as a controlled release additive produced release coatings on PET with higher release force than a control containing no controlled release additive (Bath #1) and comparatives containing a vinyl functional MQ resin in different amounts (Bath #s 2 and 3) after aging at both room temperature and elevated temperature under the conditions of Reference Example 3. Furthermore, after aging for 34 days release coatings prepared from release coating compositions containing the new controlled release additives had higher release force than the comparative examples as well. The release coatings prepared from release coating compositions containing the new controlled release additive described herein produced release coatings with better sustained adhesion strength than comparative release coatings containing the comparative controlled release additives disclosed in U.S. Pat. No. 8,933,177. Without wishing to be bound by theory, it is thought that customers desire release coatings with higher sustained adhesion strength (SAS) values for certain applications. This invention provides the benefit that release coatings with ≥94%, alternatively ≥95%, and alternatively ≥96%, for SAS can be achieved while maintaining desirable release force, even after aging.

DEFINITIONS AND USAGE OF TERMS

All amounts, ratios, and percentages herein are by weight, unless otherwise indicated. The SUMMARY and ABSTRACT are hereby incorporated by reference. The terms "comprising" or "comprise" are used herein in their broadest sense to mean and encompass the notions of "including," "include," "consist(ing) essentially of," and "consist(ing) of. The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples. The abbreviations used herein have the definitions in Table 6.

TABLE 6

Abbreviations

| Abbreviation | Definition |
|---|---|
| DP | degree of polymerization |
| FTIR | Fourier Transform Infra-Red |
| m | meter |
| Me | methyl (—$CH_3$) |
| ppm | parts per million |
| RT | room temperature of 20° C.-25° C. |
| μm | micrometer(s) |
| Vi | vinyl (—CH=$CH_2$) |

The invention has been described in an illustrative manner, and it is to be understood that the terminology which has been used is intended to be in the nature of words of description rather than of limitation. With respect to any Markush groups relied upon herein for describing particular features or aspects, different, special, and/or unexpected results may be obtained from each member of the respective Markush group independent from all other Markush members. Each member of a Markush group may be relied upon individually and or in combination and provides adequate support for specific embodiments within the scope of the appended claims.

Furthermore, any ranges and subranges relied upon in describing the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range of "2 to 20" may be further delineated into a lower third, i.e., 2 to 8, a middle third, i.e., 8 to 14, and an upper third, i.e., from 14 to 20, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit.

EMBODIMENTS OF THE INVENTION

In a first embodiment, a release coating composition comprises:
(A) a polysiloxane comprising unit formula: $M_a Q_b M^U_c D^L_{de^-} M^{OH}_q T^{OH}_r$, where subscript a≥30, subscript b≥40, subscript c≥1, subscript d≥1, a quantity (c+d)≥1, subscript e is 0 to 20, subscript q≥0, and subscript r≥0, with the proviso that a quantity (q+r) is sufficient to provide the polysiloxane with a silanol content of 0 to 1.7%;

M represents a unit of formula

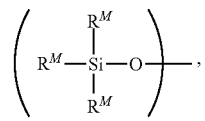

Q represents a unit of formula

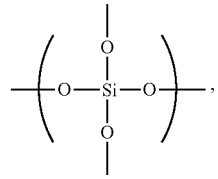

$M^U$ represents a unit of formula

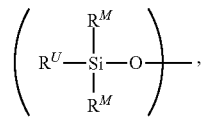

$D^L$ represents a unit of formula

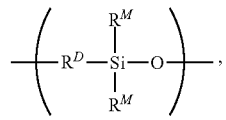

D represents a unit of formula

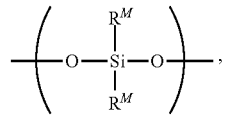

$M^{OH}$ represents a unit of formula

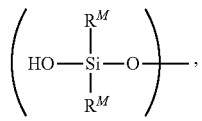

and $T^{OH}$ represents a unit of formula

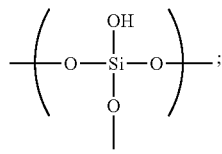

where
each $R^M$ is an independently selected monovalent hydrocarbon group of 1 to 30 carbon atoms that is free of aliphatic unsaturation, each $R^U$ is an independently selected monovalent aliphatically unsaturated hydrocarbon group of 2 to 30 carbon atoms, each $R^D$ is an independently selected divalent hydrocarbon group of 2 to 30 carbon atoms;
(B) a polyorganohydrogensiloxane having at least two silicon-bonded hydrogen atoms per molecule;
(C) a hydrosilylation reaction catalyst;
(D) a polyorganosiloxane having at least two silicon bonded aliphatically unsaturated groups per molecule;
(E) a solvent; and
(F) a hydrosilylation reaction inhibitor.

In a second embodiment, in (A) the polysiloxane, each $R^M$ is an alkyl group of 1 to 6 carbon atoms, each $R^U$ is an alkenyl group of 2 to 6 carbon atoms, each $R^D$ is an alkylene group of 2 to 6 carbon atoms, and the subscripts have values such that $30 \geq a \geq 90$, $40 \geq b \geq 120$, $16 \geq (c+d) \geq 1$, and $18 \geq e \geq 2$.

In a third embodiment, the hydrosilylation reaction inhibitor comprises an acetylenic alcohol, such as methyl butynol.

In a fourth embodiment, the solvent comprises an aromatic hydrocarbon, an aliphatic hydrocarbon, or a combination thereof.

In a fifth embodiment, the polyorganohydrogensiloxane having at least two silicon-bonded hydrogen atoms per molecule has average formula $(R^6{}_3SiO_{1/2})_{hh}(R^5{}_2SiO_{2/2})_{ii}(R^5HSiO_{2/2})_{jj}$, where each $R^5$ is an independently selected monovalent hydrocarbon group or monovalent halogenated hydrocarbon group, each $R^6$ is independently hydrogen or $R^5$, subscript hh is 2 to 10 (alternatively 2), subscript ii is 0 to 1000 (alternatively 0), and subscript jj is 2 to 500 (alternatively 2 to 100).

In a sixth embodiment, the hydrosilylation reaction catalyst comprises a complex of platinum with an organopolysiloxane.

In a seventh embodiment, the polyorganosiloxane having at least two silicon bonded aliphatically unsaturated groups per molecule has average formula: $(R^{4"}{}_3SiO_{1/2})_m(R^{4"}{}_2SiO_{2/2})_n(R^4R^{4"}SiO_{2/2})_o(R^{4"}{}_2R^{4'}SiO_{1/2})_p$, where each $R^{4"}$ is independently selected from a monovalent hydrocarbon group that is free of aliphatic unsaturation or a monovalent halogenated hydrocarbon group that is free of aliphatic unsaturation and each $R^{4'}$ is independently selected from a monovalent aliphatically unsaturated hydrocarbon group or a monovalent halogenated aliphatically unsaturated hydrocarbon group, as defined above for $R^4$, and subscript m is 0 to 10 (alternatively 0), subscript n is 0 to 1,000, subscript o is 2 to 500, and subscript p is 2 to 10 (alternatively 2), with the provisos that a quantity $(m+p) \geq 2$.

In an eighth embodiment, the release coating composition of one of the preceding embodiments further comprises an additional starting material selected from the group consisting of: (G) an anchorage additive; (H) an anti-mist additive; and (I) both (G) and (H).

In a ninth embodiment, the release coating composition of any one of the preceding embodiments has 1 weight % to 75 weight % of (A) the polysiloxane, 0.1 weight % to 5 weight % of (B) the polyorganohydrogensiloxane, a catalytically effective amount of (C) the hydrosilylation reaction catalyst sufficient to provide 5 ppmw to 300 ppmw of a platinum group metal to the release coating composition; and 20 weight % to 98 weight % of (D) the organopolysiloxane having at least two silicon-bonded aliphatically unsaturated groups per molecule, 0 to 70 weight % of (E) the solvent, and 0.002 weight % to 0.15 weight % of (F) the hydrosilylation reaction inhibitor, each based on combined weights of starting materials (A), (B), (C), (D), (E), and (F).

In a tenth embodiment, a method for forming a release liner comprises:
1) applying the release coating composition of any one of the preceding embodiments on a surface of a substrate;
optionally 2) treating the substrate before applying the release coating composition;
optionally 3) removing all or a portion of the solvent; and
4) curing the release coating composition to form a release coating on the substrate.

In an eleventh embodiment, a release liner prepared is prepared by the method of the tenth embodiment.

In an eleventh embodiment, the substrate of the release liner comprises PET.

The invention claimed is:
1. A release coating composition comprising:
(A) a polysiloxane comprising unit formula:

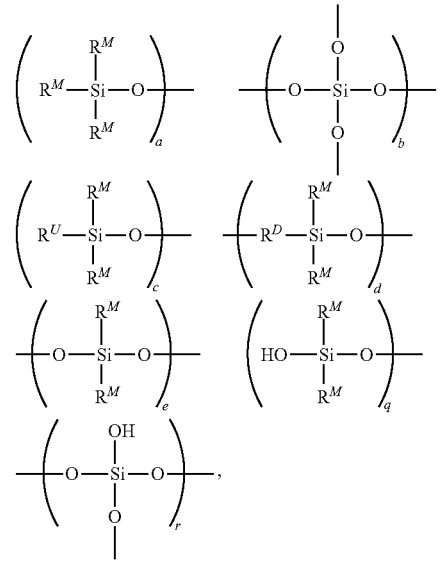

where
each $R^M$ is an independently selected monovalent hydrocarbon group of 1 to 30 carbon atoms that is free of aliphatic unsaturation,
each $R^U$ is an independently selected monovalent aliphatically unsaturated hydrocarbon group of 2 to 30 carbon atoms,
each $R^D$ is an independently selected divalent hydrocarbon group of 2 to 30 carbon atoms,
subscript $a \geq 30$,
subscript $b \geq 40$,
subscript $c \geq 1$,
subscript $d \geq 1$, a quantity (c+d)≥1,
subscript e≤20,
subscript q≥0,
subscript r≥0, and
provided that the polysiloxane has a silanol content up to 1.7 weight %;
(B) a polyorganohydrogensiloxane having at least two silicon-bonded hydrogen atoms per molecule;
(C) a hydrosilylation reaction catalyst;
(D) a polyorganosiloxane having at least two silicon bonded aliphatically unsaturated groups per molecule;
(E) a solvent; and
(F) a hydrosilylation reaction inhibitor;
where (A) the polysiloxane is present in an amount of 1 weight % to 75 weight %;
(B) the polyorganohydrogensiloxane is present in an amount of 0.1 weight % to 5 weight %,
(C) the hydrosilylation reaction catalyst is present in a catalytically effective amount sufficient to catalyze hydrosilylation reaction,
(D) the organopolysiloxane having at least two silicon-bonded aliphatically unsaturated groups per molecule is present in an amount of from 20 weight % to 98 weight %,
(E) the solvent is present in an amount of from greater than 0 to 98 weight %, and
(F) the hydrosilylation reaction inhibitor is present in an amount of from 0.002 weight % to 0.15 weight %, each based on combined weights of (A), (B), (C), (D), (E), and (F).

2. The release coating composition of claim 1, where each $R^M$ is an alkyl group of 1 to 6 carbon atoms, each $R^U$ is an alkenyl group of 2 to 6 carbon atoms, each $R^D$ is an alkylene group of 2 to 6 carbon atoms, and the subscripts have values such that 30≥a≥90, 40≥b≥120, 16≥(c+d)≥3, and 18≥e≥2.

3. The release coating composition of claim 1, where the hydrosilylation reaction inhibitor comprises an acetylenic alcohol.

4. The release coating composition of claim 1, where the polyorganohydrogensiloxane having at least two silicon-bonded hydrogen atoms per molecule has average formula $(R^6_3SiO_{1/2})_{hh}(R^5_2SiO_{2/2})_{ii}(R^5HSiO_{2/2})_{jj}$, where each $R^5$ is an independently selected monovalent hydrocarbon group or monovalent halogenated hydrocarbon group, each $R^6$ is independently hydrogen or $R^5$, subscript hh is 2 to 10, subscript ii is 0 to 1000, and subscript jj is 2 to 500.

5. The release coating composition of claim 1, further comprising: (G) an anchorage additive; (H) an anti-mist additive; or (I) both (G) and (H).

6. The release coating composition of claim 5, where the solvent comprises an aromatic hydrocarbon, an aliphatic hydrocarbon, or a combination thereof.

7. The release coating composition of claim 1, wherein a molar ratio of silicon-bonded hydrogen atoms to silicon-bonded aliphatically unsaturated groups of (A), (B), (C), and (D) combined is 1:1 to 2.5:1.

8. A method for forming a release liner, the method comprising:
1) applying the release coating composition of claim 1 on a surface of a substrate;
optionally 2) treating the substrate before applying the release coating composition;
3) Removing all or a portion of the solvent; and
4) heating the release coating composition, thereby curing the release coating composition to form a release coating on the substrate.

9. A release liner prepared by the method of claim 8.

* * * * *